(12) United States Patent
Ferrand (10) Patent No.: US 6,948,256 B2
(45) Date of Patent: Sep. 27, 2005

(54) SADDLE SUPPORT DEVICE AND ADJUSTABLE FORM JIG AND METHOD TO CORRECT FOR THE VARIATION BETWEEN ANIMAL BACKS AND SADDLES

(76) Inventor: Robert Jean Ferrand, 2995 Woodside Rd. Suite 400, Woodside, CA (US) 94062

( * ) Notice: Subject to any disclaimer, the term of this patent is extended or adjusted under 35 U.S.C. 154(b) by 72 days.

(21) Appl. No.: 10/449,446

(22) Filed: May 30, 2003

(65) Prior Publication Data

US 2003/0221328 A1 Dec. 4, 2003

Related U.S. Application Data

(60) Provisional application No. 60/385,526, filed on Jun. 4, 2002.

(51) Int. Cl.[7] ................................................ G01B 3/14
(52) U.S. Cl. ........................................ 33/511; 33/561.3
(58) Field of Search .......................... 33/511, 562, 561.3

(56) References Cited

U.S. PATENT DOCUMENTS

| | | | | |
|---|---|---|---|---|
| 365,873 A | * | 7/1887 | Spence et al. ................. | 33/511 |
| 742,937 A | * | 11/1903 | Way .......................... | 33/561.2 |
| 889,224 A | * | 6/1908 | Haas .......................... | 33/512 |
| 1,129,081 A | * | 2/1915 | Edmonds .................... | 33/561.2 |
| 1,234,527 A | * | 7/1917 | Berriman .................... | 33/514.2 |
| 1,268,002 A | * | 5/1918 | Goodwin .................... | 33/514.2 |
| 3,964,169 A | * | 6/1976 | Bush .......................... | 33/514.2 |
| 5,375,397 A | | 12/1994 | Ferrand ........................ | 54/66 |
| 6,334,262 B1 | | 1/2002 | Ferrand ....................... | 33/511 |
| 6,615,568 B1 | * | 9/2003 | Roskies ........................ | 54/66 |

* cited by examiner

Primary Examiner—Christopher W. Fulton (57) ABSTRACT

This invention relates to a saddle support device to compensate for the variations between the compound curved surfaces of animal backs and the corresponding compound curved surfaces of saddles. This invention includes a method of manufacturing that employs a measurement device with transverse linkages for defining the compound curved surface of the animal's back, that can have an additional adjustable form jig mechanism attached to create a fair curve between the transverse linkages, so that a moldable plastic can be draped over the adjustable form jig, to create a compound curved saddle support device. Employing the preferred method of manufacturing, a semi-rigid saddle support device comprising a two distinct panel structure with a single alignment arch can be made that will fit over the animal's back, to protect the loaded animal from the higher pressures caused by the variations in the saddle construction.

40 Claims, 7 Drawing Sheets

SADDLE SUPPORT DEVICE AND ADJUSTABLE FORM JIG AND METHOD TO CORRECT FOR THE VARIATION BETWEEN ANIMAL BACKS AND SADDLES

CROSS-REFERENCE TO RELATED APPLICATION

This application claims the benefit of U.S. Provisional Patent Application No. 60/385,526, filed Jun. 4, 2002. This application also relates to and incorporates by reference of U.S. Pat. No. 6,334,262 and U.S. Pat. No. 5,375,379.

STATEMENT REGARDING FEDERAL SPONSORED R & D

This invention was not developed with any Federally Sponsored R & D money

APPENDIX

| | |
|---|---|
| Background of the Invention | Pg. 3 |
| Brief Summary of the Invention | Pg. 9 |
| Brief Description of Drawings | Pg. 13 |
| Detailed Description | Pg. 14 |
| Claims | Pg. 26 |
| Abstract of the Disclosure | Pg. 30 |
| Drawings | Pg. 31 |

BACKGROUND OF THE INVENTION

1: Field of Disclosure

This disclosure relates to a saddle support device (orthotic) to compensate for the variations between the compound curved surfaces of animal backs and the corresponding compound curved surfaces of saddles. In particular, this disclosure is directed to a saddle support device and an adjustable form jig and method to build the saddle support device with the adjustable form jig, to correct for the variation between the compound curved surfaces of animal backs and the corresponding compound curved surfaces of saddles, in order to permit a variety of saddles to fit an individual animal's back, so that the animal's back is protected from trauma.

This disclosure includes an adjustable form jig attachment to a measurement device, U.S. Pat. No. 6,344,262, *A Gauge and Method for Measuring Animal Backs and Saddles*, with transverse linkages for defining the compound curved surfaces of the animals back, that can have an additional adjustable form jig mechanism added to create a polyform fair curve between the transverse linkages, to create an adjustable form jig representing the compound curved surface of the weighted animal's back, in order that a thermoplastic or catalytic plastic can be draped or pressed over the adjustable form jig, to create a compound curved panel saddle support device part comprising at least one single contiguous member comprising two distinct panels or bars, spaced apart, resting on either side of the animals spine, connected by at least one alignment arch crossing over the spine at a distance, creating an saddle support device that is substantially the same shape as the loaded animal's back, which can provide pressure relief for the animal's back created by variations in saddle construction. This same adjustable form jig could be placed on a similar structure with a different transverse linkage mechanism and effect a similar result.

Employing the method of measurement and fabrication, a semi-rigid saddle support structure can be made that will fit the weighted animal's back, to protect the animal from the variations in construction of the saddle shape.

2: Related Art

For centuries, people have ridden horses with a multitude of different saddles, but with very little scientific understanding of the effect of the saddle on the animal's back. The issue of saddle fit is not only important in the context of the humane treatment of the animal, but has even greater importance to equestrians who participate in sports that demand greater athletic performance from the animal. Signs of saddle related trauma include behavior problems, tenderness, loss of hair, white hairs, open sores, and certain forms of lameness.

Current methods of saddle fitting include using baling wire, flexible curves, cardboard templates, plaster casts, and recently thermoform sheets have been introduced. Until recently, the most sophisticated device was a pegboard. This centuries old device is comprised of a flat board, with usually about one hundred holes through which dowels are fitted. By placing this device on the animal's back and adjusting the individual dowels so that they each just touch the surface of the animal a mirror image of the shape of the un-weighted animal's back can be duplicated.

The disadvantage to the pegboard device and all other methods previously employed is that the effect of the weight of the rider on the shape of the animal's back is not considered. While the current commercial understanding of saddle fit assumes that the shape of the un-weighted animal's back is the preferred saddle fit, objective interface pressure measurement has proven this not to be true.

By employing U.S. Pat. No. 5,375,379, *A Curve Conforming Sensor Array and Method for Measuring Pressures between a Saddle and a Horse* it has been revealed that the weight of the rider causes sufficient deflection to the animal's back to cause the saddle that is fitted to the un-weighted animal not to fit when the animal the weighted. The reason for this is: the animal's back sags a little bit under the additional rider weight; which is significant enough to cause "bridging" meaning that the saddle only touches on the wither and the loin of the animal, causing trauma to the animal, from higher pressure.

A more significant disadvantage to all prior devices and methods to fit saddles is that these devices and methods do not provide any numerical or calibrated measurement. Without numerical values the error in these devices cannot be determined or corrected.

Prior to 1993, there had never been an objective method to determine saddle fit. U.S. Pat. No. 5,375,379. This interface pressure measurement device can be used to adjust the saddle to the animal by trial and error, however; this is not practical in general commerce. Another disadvantage to this sensor array is that it does not provide the three-dimensional coordinates required to relate the shape of the saddle to the shape of the animal's back, so the correct saddle can be chosen or adjusted to fit the animal. However, by employing this interface pressure measurement device in conjunction with a three dimensional measurement gauge and the additional mechanisms disclosed in this specification and method, the amount of deflection in the animal's spine caused by the weight of the rider can be determined and reduced a formula and the formula can be adjusted to compensate for additional factors, such breed, age or conditioning, in order to fabricate a two distinct panel saddle support device with an alignment arch to protect the animal's back from trauma.

The majority of saddles do not fit the animal's they are used upon, because there is no database. Until recently, no one has measured thousands of horses, and based on this data, been able to determine what similar shapes might exist, so that measured saddle trees could be fabricated. Without this information, it is an impossible task to mate two polyform shapes without any measurement data describing either of the two shapes. The result of this error is that the curvature of the saddles are generally flatter than the curvature of the animals backs. So the shape of the saddle causes "Bridging" on the shoulder and loin of the animal, which causes higher pressures that injure the animal.

Traditionally, English saddles were made with large panels filled with horsehair that could be adjusted to some degree to compensate for the variations in the shape of the animal backs. In order to increase production, modern English saddles are fitted with foam panels that are not adjustable; so one size must fit all. In addition, Modem English saddle trees are made from ancient molds that do not reflect the shape of the backs of modern breeds of animals, further causing these saddles to bridge and thereby injuring the animal.

A similar problem occurs with Western saddles. The bars that lay adjacent to the horse's spine are duplicated in solid wood using a metal pattern template. In an effort to reduce costs, the tree makers make the parts from the smallest possible dimensions since the waste in this manufacturing process is significant. This process limits the amount of curvature of the bar, creating a flatter bar than required. Therefore, the same "bridging" occurs with Western Saddles, because the saddle bars are flatter than the shape of the animals back.

Additionally, the saddle industry does not employ any method of three dimensional measurement. English saddles are sized in Narrow, Regular and Wide. Alternatively, Western saddles are sized in "quarter horse" or "semi-quarter horse" fit. The truth is these relative terms really do not mean anything, because each company interprets the terms differently, so the saddle customer has no way to relate the shape of the saddle to this shape of the animal's back.

As a practical matter, fitting the vast multitude of shapes of animal backs becomes a permutation nightmare. To simply illustrate: if one takes cross sections of the animal's back in only three places 1, 2, & 3 and then only considers two different angles at each cross section and then only consider two angles A & B between each cross section the permutation would be 2×2×2×2×2=32 different combinations. There is no way that one; two or even three sizes could fit the majority of animal backs.

So equestrians are faced with an impossible situation to fit a saddle to their animal. Most equestrians employ saddle pads in an attempt to solve the problem. Saddle pads can provide subtle improvements to a saddle that fits properly. However, a poorly fitting saddle cannot be properly fitted by just adding a saddle pad. The reason for this is that whatever material makes up the pad, when it is compressed by the weight of the rider it makes the material denser. Therefore, the high spots are pressed denser than low spots, so rather than being softer in the high spots the pads are actually denser or harder right where you want them to be softer.

Although pads do tend to even out some of the irregularities of the saddle panel, saddle pads generally cannot permit an ill-fitting saddle to fit properly. In certain situations a saddle pad can actually make the fit even worse. This situation often occurs with horses that have a steep angle to the shoulders (withers). In this situation the gullet becomes significantly narrower with the thicker pad and can make a saddle no longer fit Until of law of physics are repealed, saddle pads, made from a uniform density material cannot adjust for a poorly fitting saddle that has significant variations from the shape of the animal.

Therefore, all known prior art has focused on either shaping the saddle tree to a limited number of defined shapes and placing this saddle tree on some softer material to act as a cushion, or to make the saddle tree or the saddle panels flexible.

There have been attempts to mold a shell like structure in catalytic plastic to be attached to or fitting under the saddle tree. These structures are made by making a plaster cast of the animals back and then molding a plastic part inside of this resulting plaster mold. These structures comprise a continuous plastic structure to which felt or cushioning material is attached to the underside, for padding. Since the mold is taken from the unloaded animal, the effect of the weight of the rider cannot be considered, and a resulting error is introduced: In addition, because these structures are made from a finite number of molds, and animal's back are more variable, it is virtually impossible to match the shape of the continuous shell to the shape of the animal without measurement and the design fails for the same reasons noted above.

An additional saddle tree construction method has been to employ portions of the measurement device described in this specification, (U.S. Pat. No. 6,334,262) without the use of the additional adjustable form jig mechanism, to mold individual plywood veneer with glue, into the compound curve bar similar to the shape of the weighted horse's back and then attaching the two bars in the traditional manner, in the front with an arched wooded fork and at the back with a arched wooden cantle. This saddle tree bar structure replaces the traditional wooden saddle tree bar and is covered with leather or plastic.

There is no known prior art of introducing a saddle support structure comprising a measured three-dimensional semi-rigid plastic part comprising two distinct panels that rest on either side of the animals spine and are connected by at least one single alignment arch, which crosses over the spine at a distance, to be placed between the saddle tree and the softer' padding material, to correct for the variations in the construction of saddle tree itself. To be successful, this saddle support device would be required to be accurately measured to each individual animal, which would permit the effect of the weight of the rider relative to the weight of the animal to be considered, as a means of correcting the variation between the two surfaces. If the structure was sufficiently semi-rigid to protect the animal from the variations in the individual' saddles shape, a variety of saddles could be used on one animal significantly improving the health of the animal. If the saddle were then fitted properly to the saddle support device, the saddle support device would not need to compensate for the variations between the saddle and the animal's back and therefore could employ the material properties of the plastic material to act as a molded spring to flex with the animal when in motion.

This disclosure includes employing a measurement device with transverse linkages, (U.S. Pat. No. 6,334,262) that can have an additional adjustable form jig mechanism added to create a fair curve between the transverse linkages, to create an adjustable form jig representing the three dimensional shape of the loaded animal's back, in order that a thermoplastic or catalytic plastic can be placed over the form, to create a three dimensional part comprising two distinct panels resting spaced apart on either side of the animal's spine connected with at least one single alignment arch, crossing over the spine at a distance, inserted above two independent foam and fleece padded structures, that is substantially the same shape as the loaded animal's back. Employing the method of construction a semi-rigid saddle support device can be made that will fit over the animal's back, to protect the loaded animal from higher pressures caused by the variations in the saddle's construction or alternately if the saddle is properly fitted would permit the saddle support device panel to flex with the animal's back when the animal is in motion.

BRIEF SUMMARY OF INVENTION

The present disclosure overcomes the limitation of previous known prior art. In particular, this disclosure describes a saddle support device made from at least one continuous thermoplastic or catalytic plastic, comprising two distinct shaped panels with a single alignment arch, crossing over the spine at a distance, so that the two panels rest space apart on either side of the animals spine and a method to build the saddle support device from an adjustable form jig to make the saddle support device to correct for the variation between the compound curved surface of animal backs and the corresponding compound curved surface saddles, in order to permit a variety of saddles to fit an individual animal's back, protecting the animal from trauma.

By application of an example of this device and this method of construction, a semi-rigid structure comprising at least one single contiguous membrane with two distinct shaped panels with a single alignment arch, crossing over the spine at a distance, spaced apart on either side of the animal's spine, inserted above two independent foam and fleece padded structures, can be made that will fit over the loaded animal's back, to protect the loaded animal from higher pressures caused by the variations in the saddle's construction.

In general, by using the calibrated measurements, the incremental effect of the weight of the rider on the animal's back can be approximated to determine a more accurate size and shape of saddle support device for a particular animal and rider combination.

To verify that these measurements are in fact accurate or to refine the rider and animal weight compensation formulas, we must use the *Curve Conforming Sensor Array and Method for Measuring Pressures between a Saddle and a Horse* previously disclosed in U.S. Pat. No. 5,375,379.

This technology consists of a pressure sensitive pad attached to a computer. The pad contains an array of 256 pressure sensors that measures about 24 inches by 32 inches. To use this pressure sensitive pad, the pad is placed between the animal and the saddle and saddle support device combination and is connected to the computer. When the rider mounts the horse, the system graphically displays a variable color map that shows the amount of pressure and the location of the pressure exerted by the saddle, saddle support device and rider on the animal's back.

If the measurement gauge or the computer scan reveals that the saddle support device is "bridging," causing high pressure on the withers and loin, the measurement of the arc of the adjustable form jig can be increased incrementally to permit the saddle support device to be remanufactured in a manner to contact the back of the horse and evenly distribute the weight over the entire saddle support device panels. Conversely, if the gauge or computer scan reveals that the saddle support device "rocks," causing high pressure only on the middle of the back of the animal (no contact on the withers or loin), the arc of the adjustable form jig can be decreased to permit the saddle support device to be remanufactured in a manner to contact the back of the animal and evenly distribute the weight over the entire saddle panel. This can also be adjusted on site employing a hot air blower to heat the plastic and effect minor adjustments to specific areas.

This disclosure is generally directed to an adjustable form jig mechanism for duplicating the curvature of the back of an animal. This mechanism creates a fair curve along transverse directions comprising first, second, third and fourth elongate arms. The first and second elongate arms extend in a line and have ends joined for pivoting about a first axis transverse to the line. The third elongate arm extends transverse to the first line and is mounted relative to the first and second arms for pivoting about a second axis transverse to the first axis. The fourth arm also extends transverse to the line and is mounted relative to the first and second arms for pivoting about a third axis also transverse to the first axis. Spanning each of these elongate arms is a multiple layer of alternating thin flexible resilient sheets and a fabric such as felt. This structure permits a moveable structure that creates a polyform fair curve on either side of the adjustable form jig, upon which a thermoplastic or catalytic plastic membrane can be drape to create a saddle support device which will substantially duplicate the shape of the loaded animal's back, including the effect of the thickness of padding material.

Employing this method of manufacture, the adjustable form jig according to the disclosure employs a mechanical device having articulated transverse linkages comprising a parallelogram assembly having the first arm as one link, an opposing link, and further comprising a hub member, with transverse opposing arms or wings, each of the wings being pivotingly joined to the hub member for defining shape and indicia to determine a series of angles, and thereby be able to describe angles and arcs in order to determine the convex and concave portions of polyform shapes, to which an adjustable form jig mechanism that creates a polyform fair curve between the individual wings is attached—in this example relating to making a part that can substantially duplicate the loaded animal's back. A method and formula to adjust the shape of the adjustable form jig to compensate for the weight of the rider relative to the weight of the horse as well as additional factors is also provided by this method of manufacture.

An example of this disclosure is an adjustable form jig mechanism attached to the measurement device for duplicating the curvature of the back of an animal along transverse directions comprising: sets of arms or wings that extending in a line which joined for pivoting about a first axis transverse to the line; and a third arm extending transverse to the line, and mounted relative to the first and second arms for pivoting about a second axis transverse to the first axis, the adjustable form jig mechanism being positionable to be the same position as the measurement gauge positioned on the back of the animal with at least one link aligned along the spine and each transverse arm or wing in contact with the surface of the animal thereby the adjustable form jig mechanism is able to substantially duplicate the shape of the animal's back and correct for the additional weight of the rider or pack load.

Additionally, a method of measuring for the construction of the saddle support device part which would be substantially the same shape as the loaded back of an animal, using at least one gauge having a plurality of relatively articulating spine segments and a plurality of pairs of opposing arms or wings extending transversely at spaced locations along the spine segments and articulating transverse to the spine segments, comprising the steps of: positioning such a gauge over the back of an animal with each of the plurality of spine segments aligned over the spine of the animal. The adjustable form jig mechanism using the same components with the additional stack of alternating movable membranes made of semi-rigid resilient material and softer fabric material, over each of the transverse wings, and using the same measurements is able to substantially duplicate the shape of the loaded animal's back, which includes the thickness of the padding materials employed, by using clamping means at the outboard edges of the sheets.

Spanning each of these elongate arms is a multiple layer of alternating thin flexible resilient sheet and a fabric material such as felt. By slotting the attachment points of the transverse wings, and removing the gears, permits an asymmetrically shaped animal to be measured and these measurements transferred to the correspondingly constructed adjustable form jig. The structure permits a moveable structure that creates a fair curve on either side of the calibrated measurement device, upon which a different plastic membrane can be drape to create a saddle support device which will substantially duplicate the shape of the loaded animal's back. This same adjustable form jig could be placed on a similar structure with a different transverse linkage mechanism and effect a similar result. Further, by attaching two independent panels to the transverse linkage wings at two points, on single wings, with alignment means, on either side of the adjustable form jib, would also effect a similar result.

While maintaining the alignment of the spine segments over the back of the animal, positioning each of the wings in contact with the back of the animal, the points of contact of the wings defining a spacial array of points of the surface of the back of the animal positioning such a gauge so that the spine segments are positioned substantially the same as the spine segments of the a gauge positioned over the back of the animal and the wings are positioned to provide an array of points which conform spacially to the array of points in contact of the wings with the back of the animal and which are opposing in position relative to the surface defined by the back of the animal, the adjustable form jig using the same components with the addition of a multiple layer structure of alternating thin flexible relilient sheet and a fabric material such as felt over each of the transverse wings to create a polyform fair curve, and by using the same measurements, positioning the adjustable form jig to the same measurement numbers used by the gauge it is possible to create an saddle support device part which conforms to the same array of points, which also duplicates the shape of the loaded animal's back.

These and other features and advantages of the present disclosure and method of construction will be apparent for the example described in the following detailed description and illustrated in the accompanying drawings.

BRIEF DESCRIPTION OF DRAWINGS

in FIG. 2.

in FIG. 1

DETAILED DESCRIPTION

As has been mentioned, this disclosure is a simple device and method of manufacture directed to a saddle support device and an adjustable form jig and a method to build the saddle support device with the adjustable form jig, to correct for the variation between the compound curved surfaces of animal backs and the corresponding compound curved surface of saddles, in order to permit a variety of saddles to fit an individual animal's back. This disclosure employs a mechanical device having, in its forms, articulated transverse linkages comprising a parallelogram assembly having the first arm as one link, an opposing link, and further comprising a hub member, with transverse opposing wings each of the wings being pivotingly joined to the hub member for defining shape and indicia to determine a series of angles, and thereby be able to describe angles and arcs in order to determine the convex and concave portions of polyform shapes, that can have an additional adjustable form jig mechanism attached, comprising a multiple layers of alternating thin semi rigid sheet and a fabric such as felt, to form a structure that can create a polyform fair curve between the transverse linkages,—in this example relating to the fabrication of a compound curved two distinct panel saddle support device part connected with a single alignment arch, crossing over the spine at a distance, that is substantially the same shape as the loaded animal's back.

An aspect of this invention is a jig for making a saddle support device, the adjustable form jig comprising: a frame having a plurality of spaced surface segments defining corresponding portions of the surface of an animal back; a plurality of spaced-apart guide elements extending transverse from the frame beyond the surface segments; and at least one flexible sheet supported on the frame, the at least one flexible sheet having openings through which the guide elements extend, and thereby forming a continuous surface representative of the surface of the animal back.

A saddle generally only contacts the animal on two areas which rest on either side parallel to the spine at the distance of about two inches and are generally 6 inches wide by about 22 inches long. While the animal's body is generally round, the back of the animal in contact with the saddle adjacent to the spine is actually relatively flat. This anatomical feature permits this method to have greater accuracy.

Figure 13:
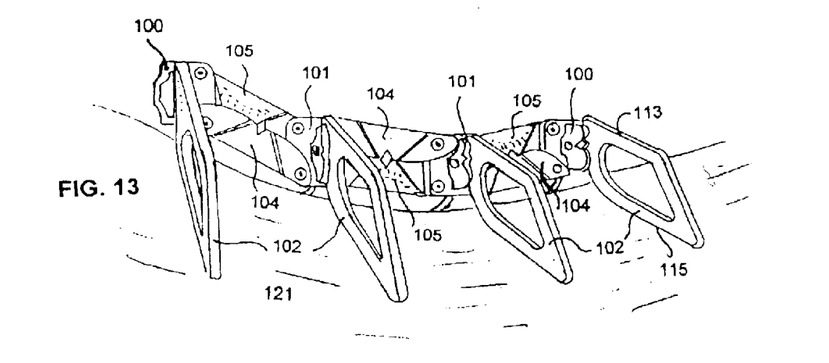
FIG. 13. is an oblique view of a measurement device, on which the adjustable form jig is placed, shown on an animals back for measurement.
Figure 17:
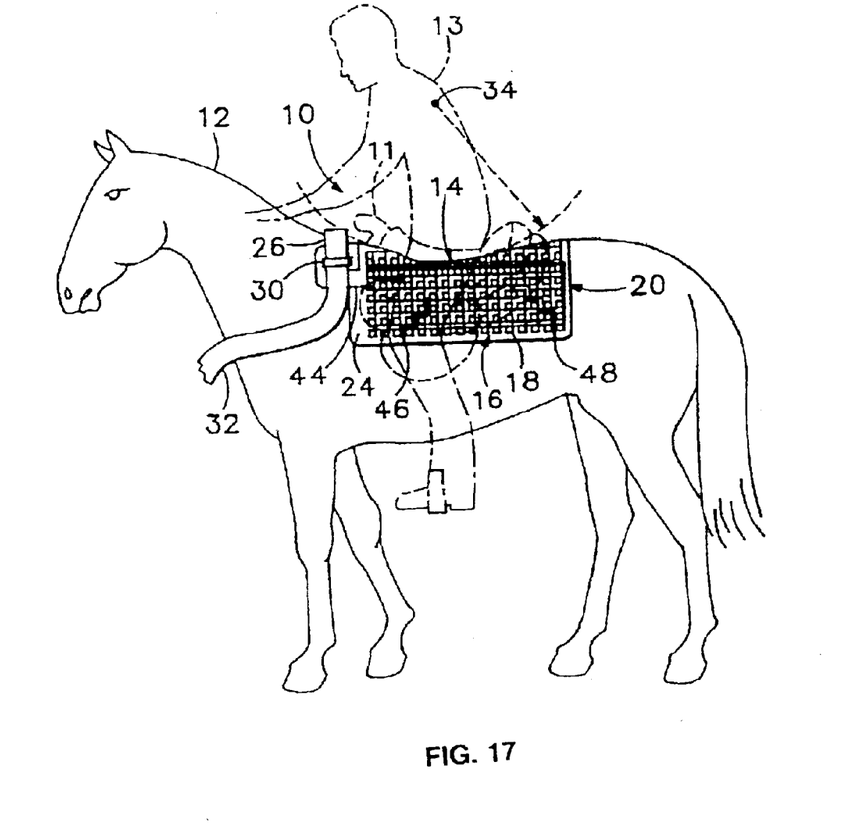
FIG. 17. is a side view of pressure sensor pad on the horse.
Figure 18:
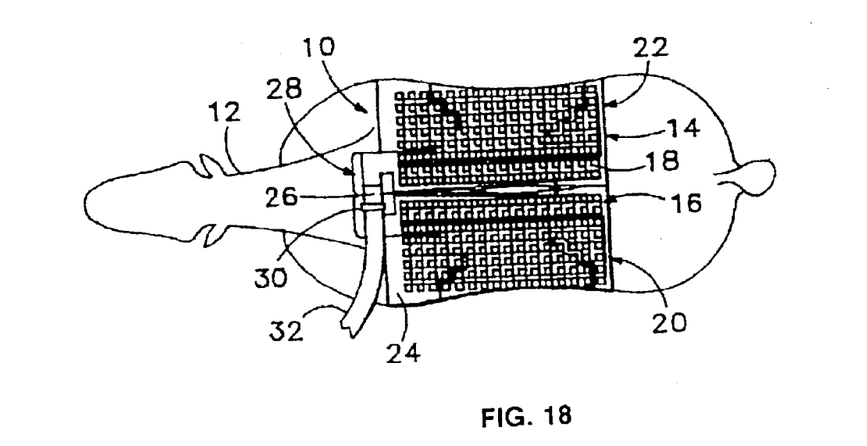
FIG. 18. is a top view of pressure sensor pad on the horse.
Figure 19:
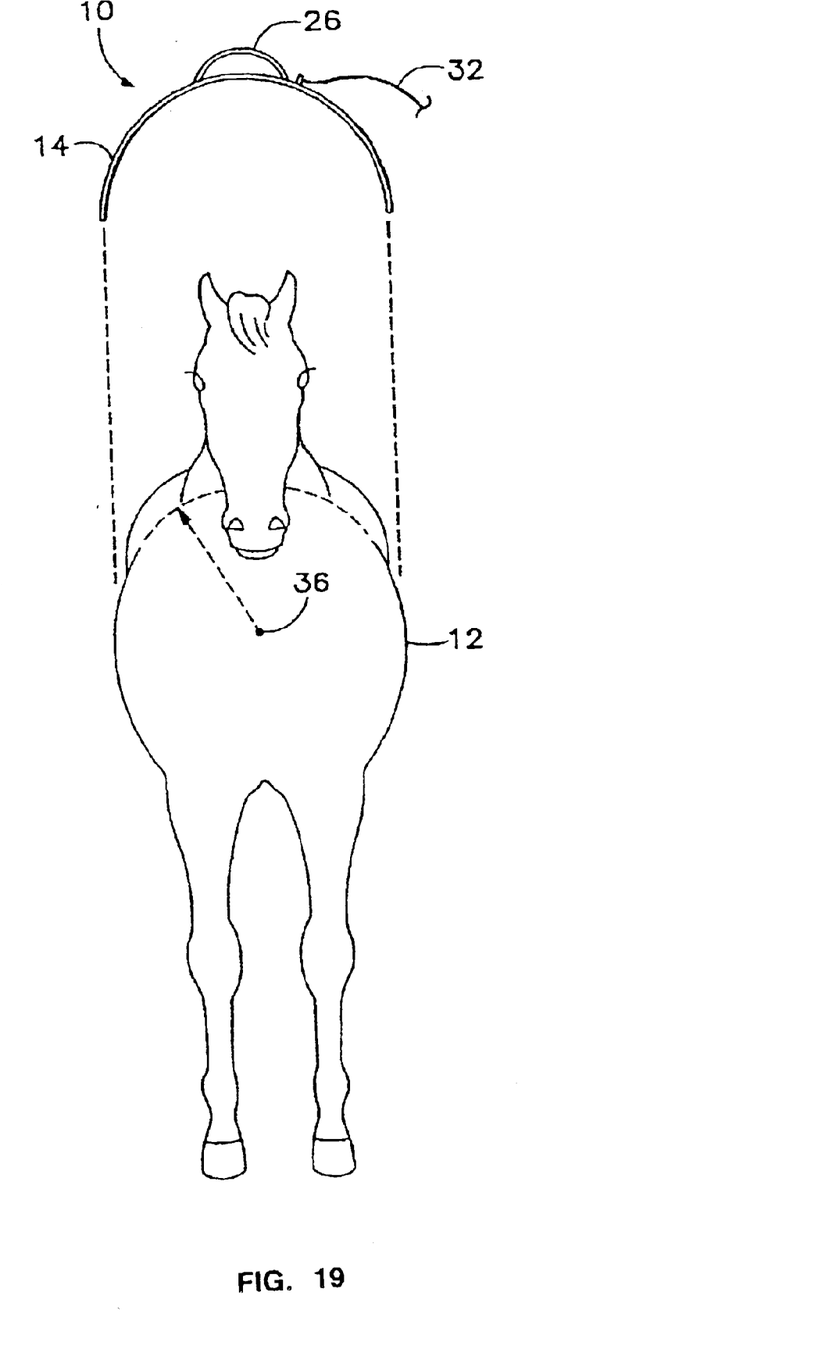
FIG. 19. is a end view of pressure sensor pad on the horse.

An example of this method of manufacture will permit measurement of a polyform shape by breaking this complex polyform shape into a series of short lines. By describing the interrelationship of these lines to each other, a complex polyform shape can be determined. An example of this method permits a simple easy device and method to determine those interrelationships. (FIG. 13) (U.S. Pat. No. 6,334,262) By using the same device to measure the animal's back as well as to fabricate the saddle support device part, a direct relationship between animal's back and saddle support device part can be established and formulas generated to compensate or correct for any errors or hysterisis that can be defined employing interface pressure measurement. (FIG. 17, FIG. 18, & FIG. 19) (U.S. Pat. No. 5,375,379)

Figure 1:
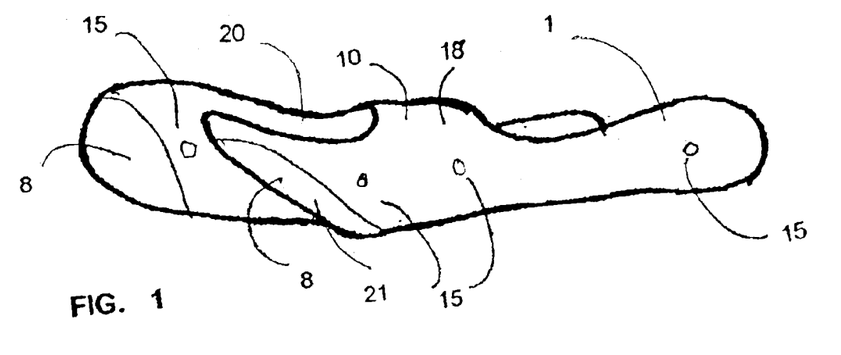
FIG. 1. is a side oblique view of an saddle support device made according to the disclosure.
Figure 2:
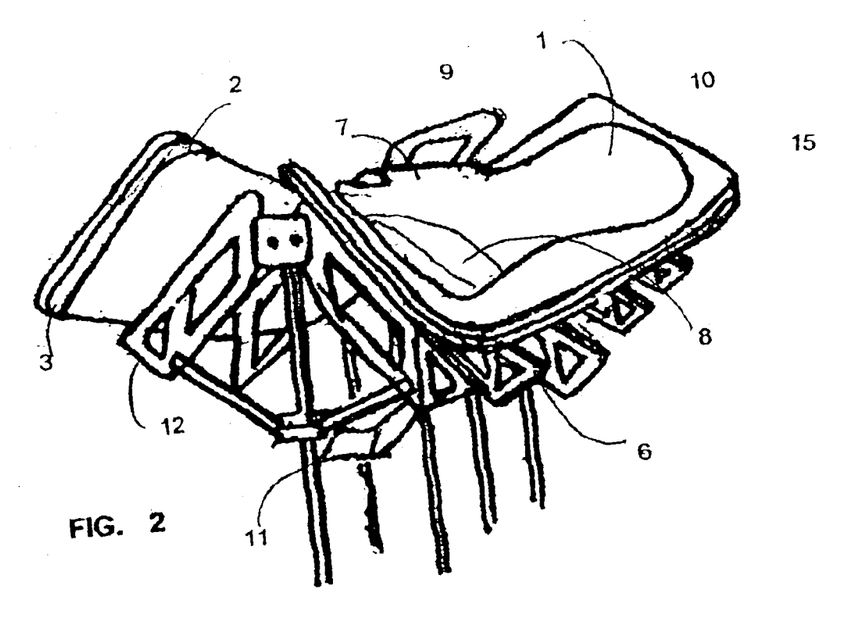
FIG. 2. is an oblique view of an saddle support device, on the adjustable form jig mechanism, on the measurement device with transverse linkages.
Figure 9:
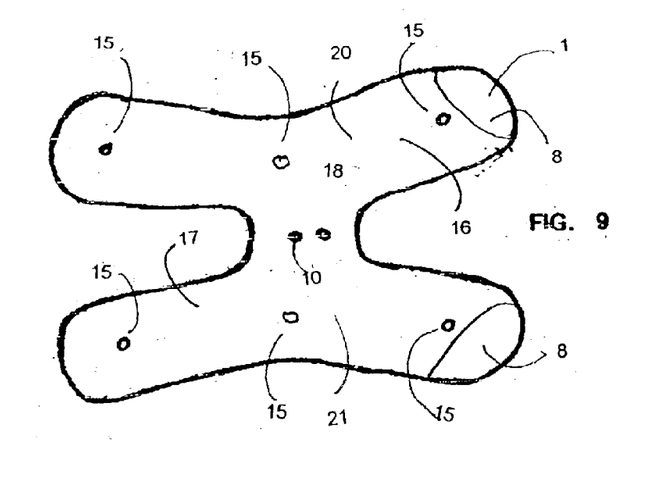
FIG. 9. is a top view of saddle support device before molding

Referring initially to FIG. 1, is a saddle support device comprising two distinct panels (FIG. 1 #20 & #21), (FIG. 9 #16 & #17), spaced apart on either side of the animals spine, connected with at least one single alignment arch, (FIG. 1 #18) crossing over the spine at a distance, that creates a compound curved two distinct panel saddle support device that is substantially the same shape as the loaded animal's back. (FIG. 1 #1) An example of this saddle support device manufactured on another device that consists of alternating multiple layers of a continuous flexible material and layers of fabric material, such as felt, that creates an adjustable form jig (FIG. 2 #2 & #3). Employing this adjustable form jig, a saddle support device can be manufactured, comprising two distinct panels (FIG. 1 #20 & #21), (FIG. 9 #16 & #17), spaced apart on either side of the animals spine, connected with at least one single alignment arch, (FIG. 1 #18) crossing over the spine at a distance, that creates a compound curved two distinct panel saddle support device that is substantially the same shape as the loaded animal's back. This saddle support device is placed into a cover structure, inserted above two independent foam and fleece padded structures, and this united structure is placed on the animal's back so that a saddle can be fitted above, to protect the animal from trauma An example of this method has unique features that facilitate manufacture. The flat sheet material can be shaped into the base uniform part (FIG. 9 #1) by making a rigid jig cut out of rigid flat material of basically the same shape as the saddle support device part itself. Then by employing an overhead pin router or router with bearings, the parts can be replicated in mass production. This is greatly facilitated by locating holes (FIG. 9 #15) at the perimeter of the part to align with the jig. By employing a jig that sandwiches the plastic material between two similar shapes, above and below the part, only two holes are required on either side of the part near the center, and vibration of the plastic part is reduced during manufacture. Alternately, computer control routers with vacuum clamping can be employed.

Figure 3:
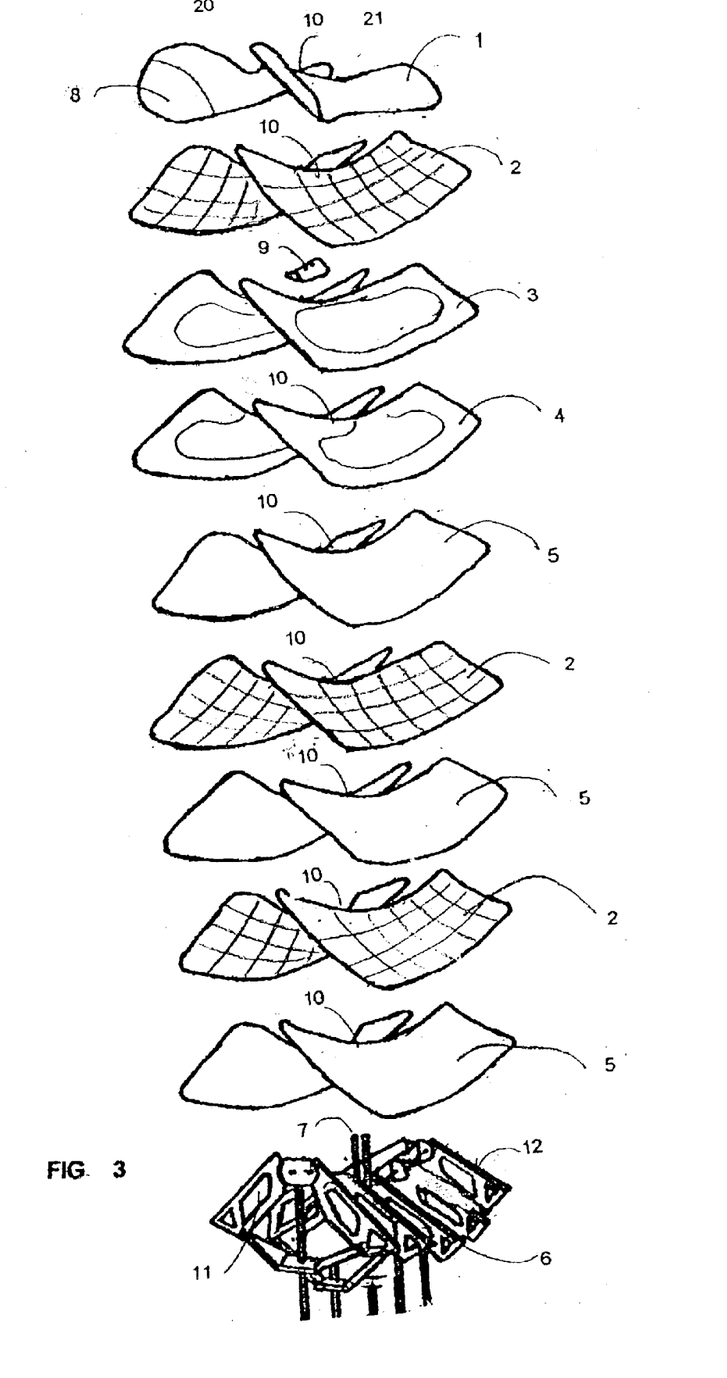
FIG. 3. is an exploded oblique view of an saddle support device, on the adjustable form jig mechanism components, on a measurement device with transverse linkages of FIG. 2.
Figure 8:
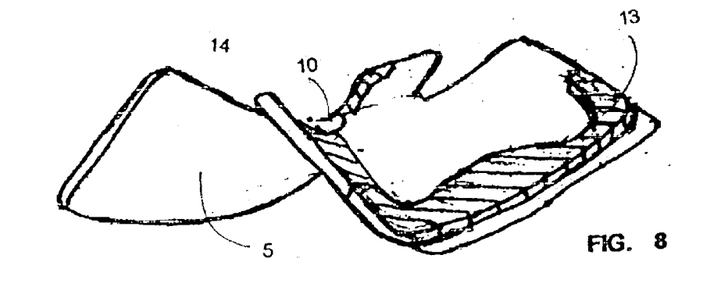
FIG. 8. is an oblique view of an adjustable form jig component for creating mold shape to align saddle support device in a flaccid state.
Figure 10:
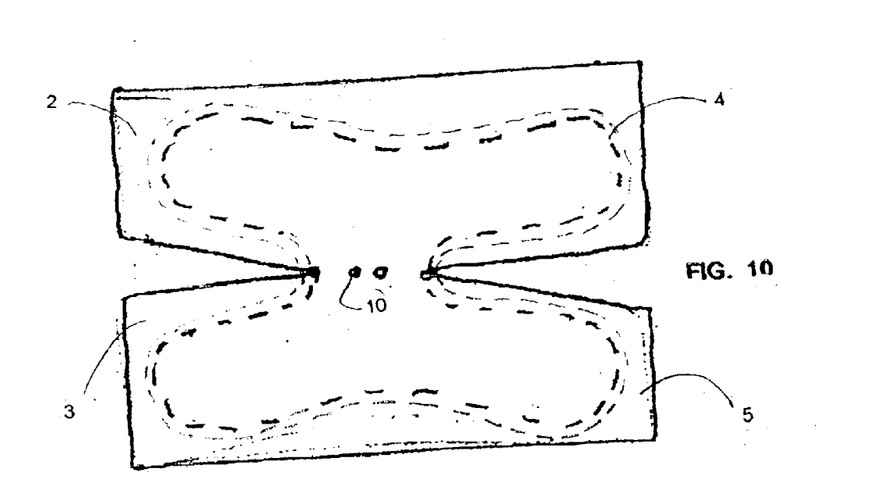
FIG. 10. is a top view of shape of adjustable form jig components in FIG. 7 and 8

Another feature of this method is to make an alignment tool employing the same shape as the saddle support device part (FIG. 9 #20), however by making the part out of substantially thinner material, the alignment tool can be draped over the adjustable form jig to position additional forms to contain the flaccid saddle support device material (FIG. 8 #13) until it becomes semi-rigid. To be able to maintain a consistent reference point, two holes (FIG. 10 #10) are required to align the parts to each other and to the transverse linkage assembly. In order to permit the transverse linkage mechanism hubs to be able to move with respect to each other, the two alignment studs (FIG. 3 #7) must be close together on a common hub and not spanning the distance between two transverse linkage hubs. If the alignment studs spanned between two hubs, as the angle between the hubs changed, with the holes remaining stationary, the movement of the linkages would be constricted, causing the sheets to buckle and not present a fair curve.

Figure 11:
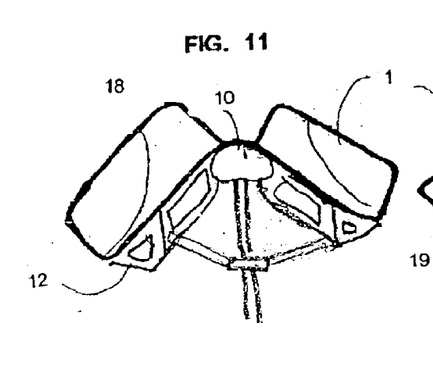
FIG. 11. is a front-end view of an adjustable form jig mechanism, on a measurement device with transverse linkages of FIG. 2
Figure 12:
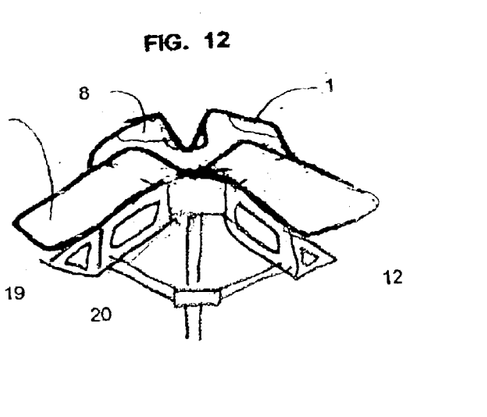
FIG. 12. is a back end view of an adjustable form jig mechanism, on a measurement device with transverse linkages of FIG. 2.

These two alignment holes (FIG. 10 #10), align with two alignment studs (FIG. 3 #7), which attach to one of the linkage hubs near the center of the adjustable form jig. These two alignment studs permit the adjustable form structure to be linked to the transverse linkage assembly and align the various components that comprise the adjustable form jig (FIG. 3 #2), (FIG. 3 #3), (FIG. 3 #4), (FIG. 3 #5), (FIG. 3 #9) as well as the saddle support device. These alignment studs, also referred to as alignment pins, are guide elements of an alignment assembly (FIG. 3 #7) that may be formed as a single, unitary member, or may include additional elements Stacking a number of similar parts alternating the material properties of the various parts or using the same material (FIG. 3 #2), (FIG. 3 #5), an integrated structure can be created that creates a fair curve between adjacent transverse linkages, and forms an adjustable form jig. By placing this structure on top of the transverse linkage assembly (FIG. 11 #12), and by employing clamping means at the outboard edges of the transverse linkage wings, the adjustable form jig can follow the same shape as the array of points that describes the shape of the loaded animal's back. By varying the material and thickness of the form parts, or maintaining consistent properties (FIG. 3 #2), (FIG. 3 #5), the amount of deflection can be controlled, and buckling avoided. Alternatively, similar resilient and fabric material could be aligned independently to a single transverse wing at two points, on either side of the adjustable form jig, employing similar alignment means, creating two independent panels to effect the same result, however, securing the material sheets would be constricted by the thickness of the layered material itself.

By shaping the parts (FIG. 3 #2), (FIG. 3 #5), generally in the shape of (FIG. 10 #2), (FIG. 10 #5), which includes the common alignment holes (FIG. 10 #10), the various components can be place one on top of the other aligned on the alignment studs (FIG. 3 #7), and can be curved in transverse directions without hindrance. The attachment means, which includes the alignment holes, must be reduced to the minimal amount, by slits cut in each of the resilient sheets and fabric materials, (FIG. 10 #2), to prevent buckling of the various material, causing the adjustable jig to not create a fair curve. The longer the attachment arch, the greater the opportunity to buckle the material. The angle of the cut can be adjusted to accommodate different shaped saddle support devices.

The number of parts (FIG. 3 #2), (FIG. 3 #5), can be increased or reduced to accommodate the different thickness of padding materials, foam, fleece or other, materials, that will cover the saddle support device when it is placed on the animal. The saddle support device can be made to the shape that is substantially the same shape as the loaded animals back, including the thickness of the padding materials. This becomes a critical factor on animals that have a shoulder angle less than 90 degrees. In such a situation the measurements must be adjusted to accommodate for the thickness of the pad. By employing this unique feature into the adjustable form jig, the structure itself can be adjusted to make this correction.

Figure 4:
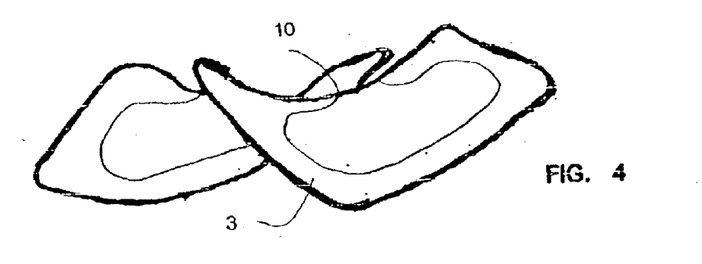
FIG. 4. is an oblique view of an adjustable form jig component for creating edge flair in FIG. 1.
Figure 5:
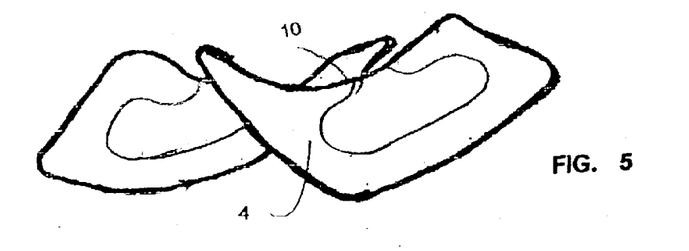
FIG. 5. is an oblique view of an adjustable form jig component for creating edge flair in FIG. 1.
Figure 6:
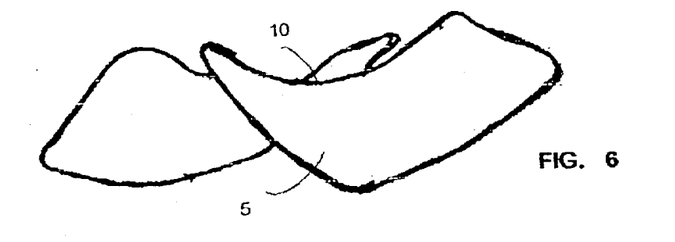
FIG. 6. is an oblique view of an adjustable form jig component made of semi-rigid sheet material for creating fair curve between transverse linkages in FIG. 2.
Figure 7:
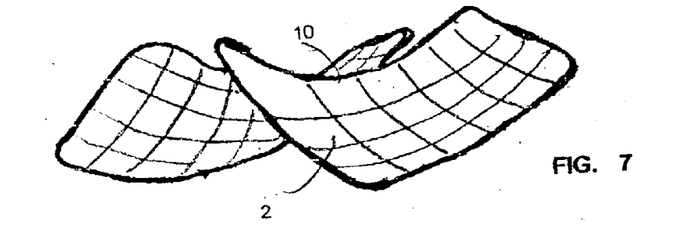
FIG. 7. is an oblique view of an adjustable form jig component made of moveable fabric material for creating fair curve between transverse linkages.

Additional features can be added to facilitate manufacture. To avoid touching the animal adjacent to the spine, the inside edges of the resilient sheet (FIG. 4 #3) can be flared upward to create a rounded surface, that will shape the flaccid material during the molding process, by premolding the top adjustable jig resilient sheet. This can be also performed post thermoform with the use of a heat gun and hand and glove manipulation. Alternatively, two parts respectively, (FIG. 3 #3), (FIG. 3 #4), can be inserted on the top of the stack to create a curved edge surface below part (FIG. 3 #2), By cutting out material (FIG. 10 #4), one alternately smaller than the other a stepped surface can be created which permits the part (FIG. 3 #10), to contour into and thereby create a controllable flair on the edges of the saddle support device in manufacturing.

An additional feature is (FIG. 3 #9) an insert wedge to control the angle of the alignment arch relative to the two side panels or bars. By employing the two alignment studs. (FIG. 3 #7), and placing corresponding holes in the insert wedge the shape and angle of the alignment arch can be manipulated. Once the part (FIG. 3 #2) is attached to the adjustable form jig a smooth fabric surface is presented upon which to form the saddle support device to any required shape.

An additional part can also be added (FIG. 8 #13) which is a formed thickness of material which is substantially the opposite of the corresponding shape of the saddle support device. Placing such a structure on the perimeter of the forming area, aligned by using alignment tool substantially the same shape of (FIG. 9 #1) the saddle support device itself, but made of of more flexible material, such a form structure can be used to form flaccid plastic into polyform shapes. These shapes can be further manipulated by added additional layers of material (FIG. 9 #8) at the front edge of the bar in order to create a substantial flair in the bar to accommodate the scapulae of the animal and further protect the animal from injury.

Figure 14:
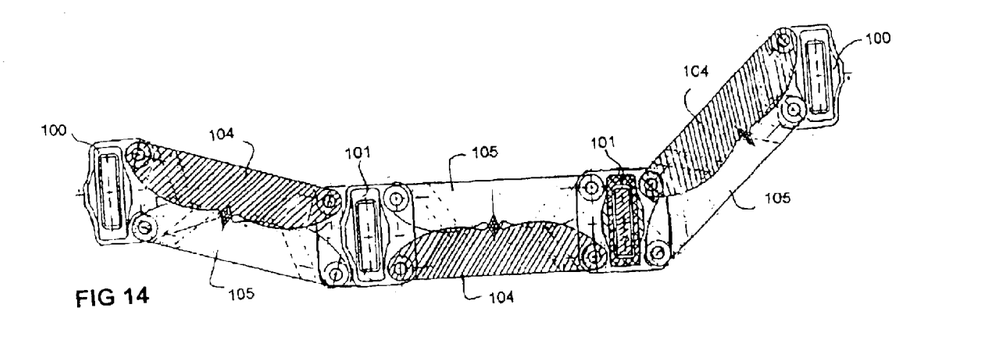
FIG. 14. is a side view of hubs and links of the measurement device
Figure 15:
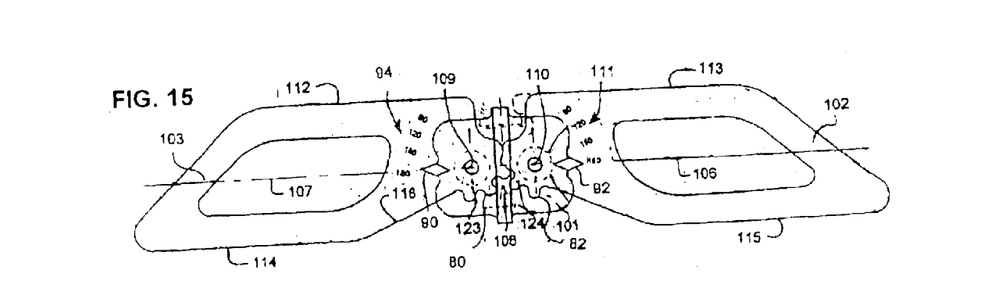
FIG. 15. is an end view of hub and wings of the measurement device.
Figure 16:
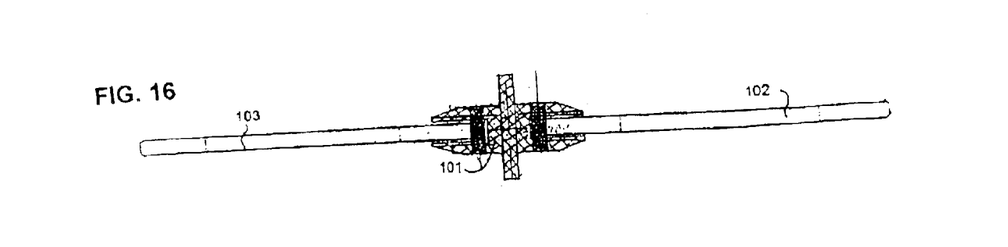
FIG. 16. is a top view of hub and wings of the measurement device.

Another important feature of the example of this method is calibration. By adding numerical calibration to this device substantially increases its utility. By physically measuring the angle between the wing sections of the device a series of numbers can be scribed on the wing (FIG. 15 #111) in relationship to a common point on either side of the hub section.(FIG. 15 #92) In a totally different method, a fixed point (FIG. 14 #105) can be made on the inner face of the link section. As the angle of the device changes, the relationship of the two links, (FIG. 14 #104), to each other will change proportionately. By calibrating this interrelationship to known angular measurements a new interrelationship creating an arc can be established.

These numerical calibrations permit a variety of advantages. First, a measurement can be taken and then recorded. At a later date, the same series of numbers can be used to readjust the Gauge and thereby be able to duplicate a polyform shape at a different time and place. A practical use of this feature would permit the measurement of an animal in California. The series of measurement numbers could then be sent to another country to an operator with a corresponding gauge and an adjustable form jig, to be adjusted to those same measurements for an animal that is thousands of miles away and a saddle support device could be manufactured.

An additional feature of this method permits a method to determine a formula that can use the measurement from an unloaded animal to approximate the effect of the load of the saddle and rider on the animal. By adding a calculated number of degrees (A), corresponding to the angle of adjustment of one degree, for each increment of rider weight (B) greater than an established rider weight (C), relative to the rider's weight (RW) the curvature of the gauge can be increased to approximate the curvature the spine of the animal would experience placed under that incremental higher rider weight. Conversely, the formula can be reversed for a lighter rider with weight less than a known established rider weight which would have less effect on the animal and the arc could be proportionately reduced.

The same principle also affects the weight of the animal. By subtracting a calculated number of degrees (X), corresponding to the angle of adjustment of one degree, for each increment of animal weight (Y) greater than an established animal weight (Z), relative to the animal's weight (AW) the curvature of the gauge can be decreased. Conversely, if the weight of the animal's less than an established animal weight it would be affected more by the weight of the rider and should therefore have a calculated number of degrees added to the arc of the gauge and the saddle.

By testing in the field, the accuracy of the formula as well as, the established rider weight (C), the incremental rider weight (B), the established animal weight (Z), the incremental animal weight (Y), can be determined by the use of an interface pressure measurement device.(FIG. 11 #20) By correlating the shape of the gauge, determined by indicia, with the measurement of the actual pressure exerted on the saddle, a mathematical relationship can be determined. By using the real numbers of the animal weight and rider weight and then experimenting with the other factors (C, B, Z, Y) by trial and error; a set of numbers that equate to a saddle that creates even pressure on the animal's back can be determined for a number of animals. Once the established rider weight (C), the incremental rider weight (B), the established animal weight (Z), the incremental animal weight (Y) are established; additional factors such as age, breeding and conditioning can be determined by the deviation from these numbers. This method creates a feedback loop that corrects for the hysteresis in the gauge itself as well as a variety of other factors, which increases accuracy.

The basic formula for a four wing gauge to compensate for rider weight is $A=(RW-C)/B$. Thus a one degree increase for every 15 lbs. of rider weight over 150 lb. of rider weight The basic formula to compensate for animal weight is $X=(Z-AW)/Y$ or one degree decrease for every 100 lbs. of animal weight over 1000 lbs of animal weight By adding the two factors together a weight compensation factor, $WCF=A+X$, can be determined. The wither and loin arcs can then be adjusted accordingly and the shape of the mounted animal's back is thereby determined.

It is important to note that the formula that is appropriate for the 4-wing gauge is different than the formula for the 5-wing gauge. This is due to a number of factors. First the 5-wing gauge is larger and therefore is measuring over a greater area and the incremental hysterisis between the top and the bottom of the gauge is not the same. Second the actual surface area that the 5 wing gauge measures is actually 25% more than the 4-wing gauge and will thus have less effect on the animal. This means that the same load is spread over a larger area and will not have the same effect as is measured by the 4-wing gauge.

The basic formula for a five wing gauge to compensate for rider weight is $A=(RW-C)/B$. Thus one degree increase for every 25 lbs. of rider weight over 100 lbs of rider lbs. The basic formula to compensate for animal weight is $X=(Z-AW)/Y$, or one degree decrease for every 125 lbs. of animal weight over 1000 lbs of animal weight By adding the two factors together a weight compensation factor, $WCF=A+X$ can be determined. The wither and loin arcs can then be adjusted accordingly and the shape of the mounted animal's back is thereby determined.

Numerical values do permit formulas to compensate for a variety of factors. By adjusting the calculated number of degrees (X) or (A) by changing the incremental animal weight (Y) or the incremental rider weight (B) or the established animal weight (Z) or the established rider weight (C) the curvature of the arc of the gauge can be adjusted for a variety of factors.

Additional data acquired from the computer saddle fitting system can be used to refine the formulas to compensate for additional factors and increase the accuracy of the formulas. By testing a variety of animals under various loaded conditions a relationship between the Gauge measurements (FIG. 13 #100) and actual real time interface pressure measurements can be made using the interface pressure measurement device (FIG. 17 #20) to develop a data base and offset table and thereby compensate for the hysterisis in the gauge as well as the variety of factors affecting the animal.

Since saddle fit is affected by a variety of factors, including the weight of the rider, the weight of the animal, the age of the animal, the condition of the animal, the type of saddle, the surface area of the saddle panels, the type of riding and the skill of the rider, a variety of adjustments to this formula will evolve over time using this instrument. It is anticipated that groups will begin to develop schools of thought to interpret the formula in different ways as well as establish new formulas and standards for particular styles of riding and riding disciplines.

A subtle variation of this measurement is also provided by this disclosure. Many animals are not even side-to-side. An example permits a few degrees of variation to be measured side to side. Lifting one wing upward while holding the opposite wing down will permit this measurement. This is accomplished by adjusting the backlash in the gears to a fraction of an inch, but just enough so that when the wings are moved simultaneously they measure symmetrically. However by forcing the wings in opposite directions an asymmetrical measurement can be observed. Alternatively, the wings could be attached to the slots in the hubs and with the gears removed significant differences in the asymmetry of the animal could be measured and the corresponding saddle support device manufactured with the adjustable form jig.

The method to measure the animal in order to fabricate the saddle support device part with the adjustable form jig would be:

1. Be sure that the animal is standing with all four feet square to each other and that the animal's head is in a normal position when riding.
2. Place the Saddle on the animal and mark the position in the front and the back of the saddle with tape or chalk on the animal's back
3. Adjust the wings to 120 degrees and the wither and loin arc to 25 degrees. The purpose of this adjustment is to put the Gauge in a configuration only to facilitate ease of measurement so that the wings would be nearer the adjusted angle and the wither and loin wings are out of the way for initial placement.
4. Center the Gauge on the animal in the same position that you will put the center of the saddle, meaning centered between the previously marked position of the saddle. Make sure that the wings are adjusted perpendicular to the ground.
5. Adjust the Center wings down so that the bottom edges of the wings have maximum contact with the animal's back.
6. Adjust the wither and loin wings down so that the bottom edges have maximum contact with the animal's back. Double Check that the faces of the Wings are perpendicular to the ground. Record the Measurements from each of the respective wing (arm) indicia and the arc (link) indicia on the Gauge and Photograph the Gauge on the animal. The following is an example of the measurements from a four-wing gauge.

| Wither | Shoulder | | Center | Back | | Loin |
|---|---|---|---|---|---|---|
| Angle | Arc | Angle | Arc | Angle | Arc | Angle |
| 90 | 25 | 110 | 5 | 130 | 5 | 140 |

(Note that devices with a greater number of wings will also have a proportionately larger number of measurements and vise versa.)

The method to measure the saddle to determine to degree a variation relative to the horse would be:

9. Lift the Gauge off the animal without moving the position of the Gauge.
10. If necessary, adjust wither (pommel) arc and loin (cantle) arcs of the Gauge using the WCF (Weight Compensation Factor) to compensate for the weight of the rider relative to the weight of the animal using the appropriate formula.

The relative angle of the wings to each other are varied an amount determined by the equation $WCF=(RW-C)/B+(Z-AW)/Y$, where WCF is the change in the angle of the wings to each other, by adjusting the wither and loin arcs by that amount, RW is the weight of the rider, C is the established weight of the rider, B is the variance in weight of the rider from the established weight of the rider corresponding to the angle of adjustment of one degree, AW is the weight of the animal, Z is the established weight of the animal, and Y is the variance in the weight of an animal from the established weight of the animal corresponding to an angle of adjustment of one degree.

Note: additional factors may require refined formulas. Additional factors affecting saddle fit include the age of the animal, the condition of the animal, the type of saddle, the surface area of the saddle panels, the type of riding and the skill of the rider. Appropriate adjustments can be made using this method to account for additional factors.

11. Turn the Gauge upside down and place the Gauge in the Saddle.
12. Center the Gauge in the center of the saddle, equidistant from the front (pommel or fork) and back (cantle) of the saddle.
13. Use the Saddle Fitting Guide to determine the best possible saddle fit for a particular animal.

The saddle "Fits": if all the wings touch the saddle uniformly.

The saddle "Rocks": if the wither and loin wings touch the saddle only in the center and are a distance from the saddle at the wither and loin.

The saddle "Bridges": if all the wither and loin wings touch the saddle at the pommel (front) and cantle (back) and do not touch in the center of the saddle.

14. By making an additional measurement employing an interface pressure measurement device, the formula can be calibrated to adjust for additional factors such and age, breeding, or conditioning.

If the gauge or computer scan reveals that the saddle support device is "bridging," causing high pressure on the withers and loin, the measurement of the arc of the saddle support device can be increased incrementally to permit the saddle support device to contact the back of the animal and evenly distribute the weight over the entire saddle support device panel by adjusting incremental rider weight (B) or the incremental animal weight (Y) Conversely, if the gauge or the computer scan reveals that the saddle support device "rocks," causing high pressure only on the middle of the back of the animal (no contact on the withers or loin), the arc of the saddle support device can be decreased to permit the saddle support device to contact the back of the animal and evenly distribute the weight over the entire saddle support device panel, by adjusting either the established rider weight (C) or the established animal weight (Z), Using the example of this disclosure a method of manufacture for a saddle support device would be to:

1. Assemble the component parts of the adjustable form jig (FIG. 3) on to the transverse linkage assembly, aligning each part on to the two common alignment studs. (FIG. 3 #7)
2. Completely release all clamping means at the outboard edges of the adjustable form jig so that the parts of the adjustable form jig is free to move with respect to each other.
3. Adjust the transverse linkage assembly employing the calibrated indicia to correspond to the measurements taken on the animal, correcting for the effect of the weight the rider relative to the weight of the animal, and padding material, with substantially the same gauge measurement assembly or alternate predetermined coordinates.
4. Alternatively, a different transverse wing assembly attached relative to each wing assembly by different means could be adjusted to a three dimensional form made by other means using other measurement data sets and effect the same result.
5. Begin tightening the clamping means at the outboard edges of the adjustable form jig, bringing the adjustable jig form semi-rigid sheet parts down so that they touch the top of the transverse linkage wing assembly on both sides, creating substantially the same shape as to top surface of the transverse linkage wing assembly.
6. Perform the same process on each of the transverse wing sets starting in the center and moving outward from front to back to avoid buckling of the sheet material due to stress due to twisting on three axis.
7. Place the alignment tool onto the alignment studs and weight the tool to determine the saddle support device position. Align the corresponding form structure to contain flaccid plastic. (FIG. 8 #13) Remove alignment tool.
8. Place additional layers of material on the front edge of the adjustable form jig to create a raised form, to flair the front edge of the panel to correspond to the area adjacent to the scapula of the animal. (FIG. 8 #15)
9. Place plastic blank material (FIG. 9 #1) into the oven and heat the matierial to required forming temperature.
10. Remove plastic blank material from oven and place on the adjustable form jig. Align edges of saddle support device with corresponding form structures.(FIG. 8 #13) Press flaccid plastic material into adjustable form jig by hand or vacuum. Hand massage of the areas of greatest contour may be required. Pressure must be maintained until plastic cools to semi-rigid state.
11. Place saddle support device into cover set above foam and material.
12. Place interface pressure sensor array onto animal (FIG. 17 #20)
13. Place saddle support device with cover set including padding material onto the pressure sensor array on the animal
14. Place saddle on the saddle support device
15. Place the selected weight in the saddle.
16. Measure interface pressure measurement with the rider or pack weight in the saddle, to determine the accuracy of the fit.
17. If necessary, adjust saddle support device by adjusting the formula and then repeating the process #1 to #10, with new measurements.
18. Alternatively, minor adjustments can be made by selective heating of select areas with a hot air blower or heat gun and hand messaging the plastic to create the required even pressure on the animal, determined by the interface pressure measurement device. (FIG. 17)
19. Repeat steps 10, 11, 12 until even pressure throughout the length of the bars on both side of the spine is achieved determined by interface pressure measurement.

Variations to this disclosure are possible using different mechanical means. The wings can be suspended inside of a tube using washers with incline planes that function as wedges to lock the position of the wings. That same tube can then become the rotational axis and bearing surface for links that would have holes at each end to receive the tube and similar washers with incline planes that would wedge the parts together and lock the system. This system would not be desirable because of the additional cost due to the greater of number of parts and the complexity of making such parts. This disclosure uses a minimal number of parts for ease of manufacture. The enclosed figures describe the example of this disclosure.

By use of this adjustable form jig and the application of this method of manufacture the convex and concave portions of polyform shapes of an animal's back and the corresponding saddles can be created in a saddle support device in a cost effective manner.

Although the present disclosure has been described in detail with reference to a particular example, persons possessing ordinary skill in the art to which this disclosure pertains will appreciate that various modification and enhancements may be made without departing for the spirit and scope of the claims as written and as judicially construed according to principles of law. The above disclosure is thus intended for purposes of illustration and not limitation.

What is claimed is:

1. A jig for making a saddle support device, the jig comprising:

a frame having a plurality of spaced surface segments defining corresponding three-dimensional portions of the surface of an animal back; a plurality of spaced-apart guide elements extending transverse from the frame beyond the surface segments; and at least one flexible sheet supported, but not attached, on the frame, permitting sliding means, the at least one flexible sheet having openings through which the guide elements extend, and thereby forming a continuous surface representative of the surface of the animal's back.

2. The jig of claim 1, where the frame is a three-dimensional multi-link assembly with transversely oriented members having the surface segments, the members being adapted to be relatively adjusted.

3. The jig of claim 1, where the guide elements are attached to one of the surface segments.

4. The jig of claim 1, where the guide elements are parallel pins not attached to surface segments.

5. The jig of claim 1, where the flexible sheets include at least one resilient sheet, and at least one flexible sheet that is substantially rigid along a face of the sheet.

6. The jig of claim 1, further comprising pre-formed elements supported relative to the frame for biasing a portion of the flexible sheets away from the frame.

7. The jig of claim 1, where the surface segments define a three-dimensional portion of an animal back on a side adjacent to a spine.

8. The jig of claim 1, where the surface segments define a three-dimensional portion of an animal back on opposite sides adjacent to a spine.

9. The jig of claim 8, where each sheet includes spaced-apart panels corresponding to portions of an animal back on opposite sides of a spine.

10. The jig of claim 9, where the spaced-apart panels have respective lengths corresponding to lengths of a portion of an animal back extending along the spine, the panels being connected by a shorter-length panel extending between the spaced-apart panels.

11. The jig of claim 10, where the guide elements extend through the shorter-length panel.

12. The jig of claim 11, where the guide elements are pins attached to a surface segment aligned with a portion of the animal back corresponding to the spine.

13. The jig of claim 1, further comprising a barrer positioned on the perimeter of the at least one sheet having a thickness appropriate to retain the saddle support device during forming.

14. A method of making a saddle support device comprising placing on the jig of claim 13 a thermoplastic material in flaccid state, and cooling the thermoplastic material.

15. A method of making a saddle support device comprising placing on the jig of claim 1 a thermoplastic material in flaccid state, and cooling the thermoplastic material.

16. A method of making a jig for making a formed saddle pad comprising: providing a frame having a plurality of spaced surface segments defining a desired surface, including surface segments corresponding to portions of an animal back, and at least one flexible sheet;

sequentially placing the at least one flexible sheet on the surface segments of the frame, and thereby forming a continuous surface representative of the desired surface; and securing the at least one flexible sheet relative to the frame at spaced positions along the desired surface.

17. The method of claim 16, where providing further includes providing a plurality of guide elements extending transverse from the frame beyond the surface segments, the guide elements being at the spaced positions along the desired surface, and providing the flexible sheet with openings sized and positioned to receive the guide elements.

18. The method of claim 17, where securing includes placing the at least one sheet on the surface segments with the guide elements extending through the openings.

19. The method of claim 17, where providing includes providing the frame with the guide elements attached to one of the surface segments.

20. The method of claim 17, where providing the guide elements includes providing parallel pins.

21. The method of claim 16, where providing the at least one flexible sheet includes providing at least one resilient sheet, and at least one flexible sheet that is substantially rigid along a face of the sheet, and placing includes placing on the frame alternately one resilient sheet and one flexible sheet that is substantially rigid along a face of the sheet.

22. The method of claim 16, further comprising biasing a portion of the flexible sheets away from the frame.

23. The method of claim 22, where biasing includes supporting pre-formed elements relative to the frame for holding the portion of the flexible sheets away from the frame.

24. The method of claim 16, where providing the frame includes providing the frame with surface segments that define a portion of an animal back on a side of an animal spine.

25. The method of claim 16, where providing the frame includes providing the frame with surface segments that define a portion of an animal back on both sides of an animal spine.

26. The method of claim 25, where providing the frame includes providing the frame with adjustable surface segments, and adjusting the spaced surface segments so that they correspond to portions of an animal back on opposite sides of the animal spine.

27. The method of claim 25, where providing the at least one sheet includes providing the at least one sheet with spaced-apart panels corresponding to portions of an animal back on opposite sides of a spine.

28. The method of claim 27, where providing the at least one sheet with spaced-apart panels includes providing the at least one sheet with spaced-apart panels having respective lengths corresponding to lengths of a portion of an animal back extending along the spine, and with a shorter-length panel extending between the spaced-apart panels.

29. The method of claim 27, where securing includes securing the at least one sheet along the shorter-length panel.

30. The method of claim 29, where providing further includes providing a plurality of guide elements extending transverse from the frame beyond the surface segments in line with the shorter-length panel, and providing the flexible sheet with openings in the shorter-length panel sized and positioned to receive the guide elements, and where securing includes placing the at least one sheet on the surface segments with the guide elements extending through the openings in the shorter-length panel.

31. A method of making a saddle support comprising making a jig according to the method of claim 30, placing on the jig a thermoplastic material in flaccid state, and cooling the thermoplastic material.

32. A method of making a saddle support comprising making a jig according to the method of claim 30, placing on the jig a malleable material that adapts to a form, and through chemical or temperature means changes to a more resilient state, over time.

33. The method of claim 16, further comprising placing a barrier on the perimeter of the at least one sheet having a thickness appropriate to retain the saddle support during forming.

34. A method of making a saddle support comprising making a jig according to the method of claim 16, placing on the jig a thermoplastic material in flaccid state, and cooling the thermoplastic material.

35. The saddle support device of claim 34, wherein the at least one alignment arch is shorter than the two distinct panels, resting on either side of the animals spine.

36. The saddle support device of claim 34, wherein the at least one alignment arch is shorter than the two distinct panels, resting on either side of the animals spine, is located near the center of the saddle support device.

37. The saddle support device of claim 34, wherein the two panels have forward edges adapted to be positioned toward the head of an animal when the panels are placed on an animal back, the forward edges flaring away from the animal back to accommodate the scapulae of the animal.

38. The saddle support device of claim 34, wherein the two panels have forward edges adapted to be positioned toward the head of an animal when the panels are placed on an animal back, the forward edges flaring away from the animal back to accommodate the scapulae of the animal which are asymmetrically positioned.

39. A method of making a saddle support comprising making a jig according to the method of claim 16, placing on the jig a malleable material that adapts to a form, and through chemical or temperature means changes to a more resilient state, over time.

40. A saddle support device made according to the method of claim 16 comprising: at least one single continuous member comprising two distinct panels or bars, spaced apart, adapted to rest on either side of the animals spine, connected by at least one alignment arch crossing over the spine, whereby the two panels or bars have substantially the same shape as a loaded animal's back.

* * * * *